UNITED STATES PATENT OFFICE.

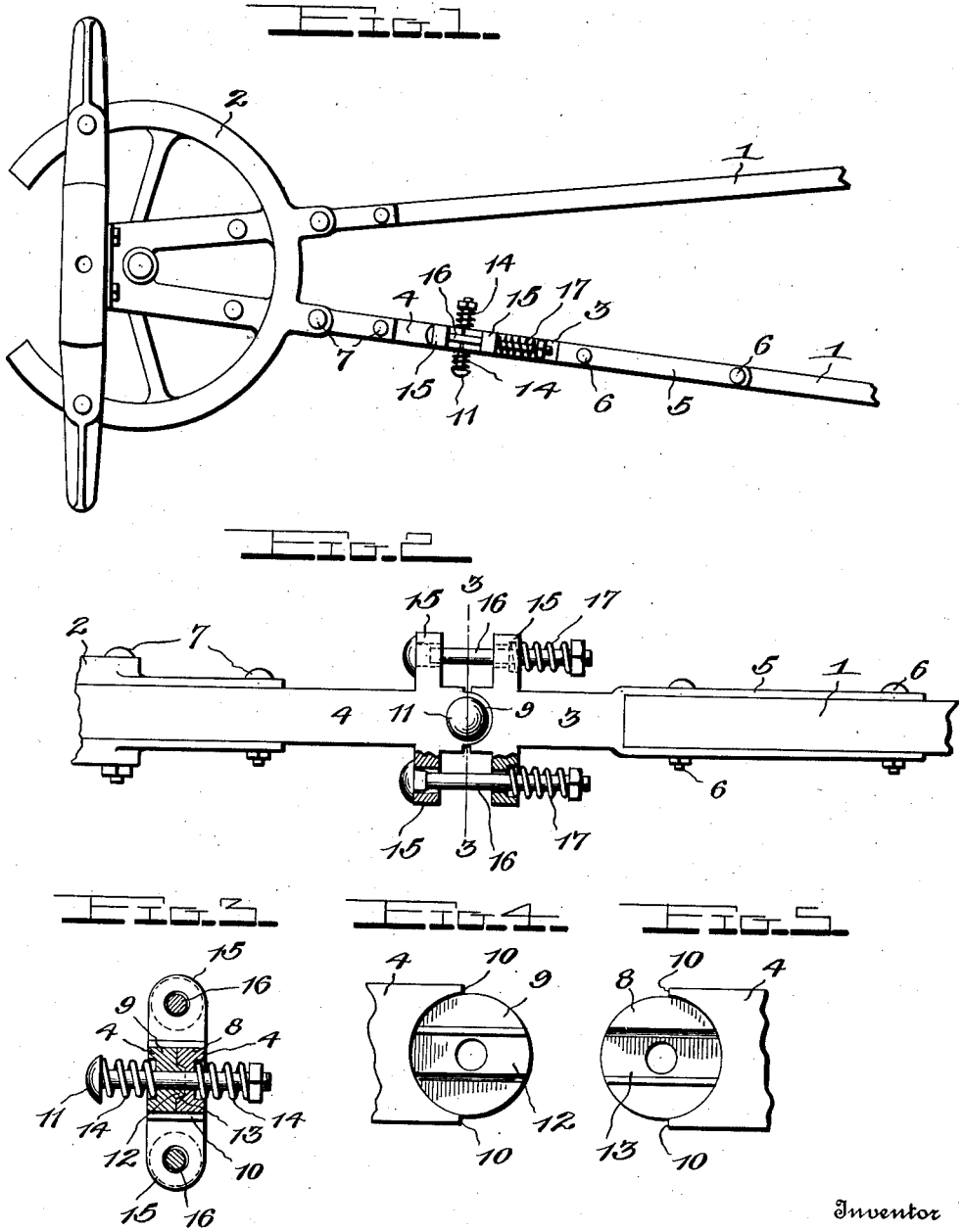

AUGUST C. WALTER, OF ALEX, OKLAHOMA.

REACH FOR VEHICLES.

1,100,797.

Specification of Letters Patent.

Patented June 23, 1914.

Application filed January 8, 1914. Serial No. 810,922.

*To all whom it may concern:*

Be it known that I, AUGUST C. WALTER, citizen of the United States, residing at Alex, in the county of Grady and State of Oklahoma, have invented certain new and useful Improvements in Reaches for Vehicles, of which the following is a specification.

This invention relates to reaches for vehicles and more particularly to a somewhat yielding or flexible joint which may be arranged in one or more of the reach bars or between the latter and the fifth wheel of a buggy or similar vehicle.

The object of the invention is to provide a joint or connection of this character which may be used for repairing a broken buggy reach as well as provide a substantially rigid yet yielding connection between the reach and the fifth wheel of a buggy or other vehicle so that when severe strain is placed upon the running gear, my improved coupling devices will yield sufficiently to prevent the reach bar or bars from breaking.

With the above and other objects in view, the invention consists of certain novel features of construction, combination and arrangement of parts as will be more fully described and claimed.

In the accompanying drawings: Figure 1 is a plan view of a fifth wheel and portions of the reach bars of a buggy showing my improved joint or connecting member in one of the bars; Fig. 2 is a side elevation of the joint or coupling member parts being broken away and in section; Fig. 3 is a vertical cross section taken on the line 3—3 of Fig. 2; and Figs. 4 and 5 are inner side views of the ends of the two coupling members.

In the present embodiment of the invention, the latter is shown arranged between one of the broken reach bars 1 and the fifth wheel 2 of the running gear of a buggy and while my invention is adapted for repair work of this character, it will be understood that it may be arranged in both reach bars or between the latter and the fifth wheel for the purpose of providing a substantially rigid connection which will yield sufficiently to prevent breakage when the parts are placed under great strain.

My invention comprises two coupling members 3, 4 here shown in the form of bars and adapted to have their adjacent ends connected as hereinafter set forth and their opposite ends united in any suitable manner to the fifth wheel and reach or between two sections of the reach. As illustrated, the member 3 has its rear end forked to provide spaced arms 5 adapted to receive the broken portion of the reach 1 which latter is sawed off square, and to be secured to the same by bolts or suitable fastenings 6. The front end of the member 4 may be similarly constructed but as illustrated it is shaped similar to the forward end of the broken reach and is secured in the fifth wheel by the bolts 7 which fastened the original reach in position.

The members or bars 3, 4 have their forward ends recessed and shaped to form overlapping circular contact or bearing plates 8, 9 and stop shoulders 10. The plates 8, 9 are centrally apertured to receive a pivot bolt 11 and on the inner face of the plate 9 is a longitudinally extending rib or tongue 12 with beveled or rounded edges adapted to fit in a similar shaped recess 13 formed in the opposing plate 9. Coil springs 14 are arranged on the projecting ends of the bolt 10 between its head and adjusting nut and seats formed in the outer faces of the circular bearing plates 8, 9, as clearly shown in Fig. 3, so that the plates are normally held in close contact but may yield laterally and also turn slightly on the pivot 11 when the reach is placed under great strain, the swinging movement of the two members 3, 4 being limited by the stop shoulders 10.

To maintain the coupling members or bars normally in longitudinal alinement and to make the reach substantially rigid, spring connections are provided on opposite sides of the pivot 11 and in a plane at right angles to the axis of said pivot. These spring connections are formed by providing on the said members 3, 4 adjacent their ends oppositely projecting apertured ears 15 through which loosely pass connecting bolts 16. The latter as shown in Fig. 2 have flat faced enlargements adjacent their heads to fit in corresponding shaped seats in the ears 15 of the member 4 and coil springs 17 are arranged on the opposite ends of the bolts between their adjusting nuts and seats formed in the ears 15 on the member 3.

Owing to the above described connections it will be seen that a substantially rigid reach is provided between the members 3, 4 but they yield both vertically and laterally to a limited degree when the parts of the running gear are placed under excessive strain.

Various changes in the form, proportion and the minor details of construction may be resorted to without departing from the principle or sacrificing any of the advantages of the claimed invention.

What I claim is:

1. A coupling device of the character set forth comprising pivotally connected members having oppositely projecting apertured ears, bolts arranged in said ears and disposed in planes at right angles to the pivotal connection between the members and springs on the bolts to draw the opposing ears together.

2. A coupling device of the character set forth comprising coupling members having overlapped apertured ends, a transverse pivot arranged in the apertures, springs upon the projecting ends of said pivot to yieldingly hold the overlapped members in contact and spring connections uniting the two members on opposite sides of their pivot, said spring connections being disposed in planes at right angles to the longitudinal axis of the pivot.

3. A coupling device of the character set forth comprising coupling members having overlapped apertured ends, a transverse pivot arranged in the apertures, springs upon the projecting ends of said pivot to yieldingly hold the overlapped members in contact, a longitudinal rib formed on one of said ends, the other end having a recess to receive said rib, the latter being retained therein by the action of said springs, and spring connections uniting said members on opposite sides of said pivot, said connections being disposed in planes at right angles to the longitudinal axis of the pivot.

In testimony whereof I affix my signature in presence of two witnesses.

AUGUST C. WALTER.

Witnesses:
S. A. BRIMLEY,
JAMES DAVIS.

Copies of this patent may be obtained for five cents each, by addressing the "Commissioner of Patents, Washington, D. C."